United States Patent [19]

Chung

[11] Patent Number: 4,675,881
[45] Date of Patent: Jun. 23, 1987

[54] ARRANGEMENT FOR RECOVERING A CLOCK SIGNAL FROM AN ANGLE-MODULATED CARRIER SIGNAL HAVING A MODULATION INDEX M=0.5

[75] Inventor: Kah-Seng Chung, Eindhoven, Netherlands

[73] Assignee: U.S. Philips Corporation, New York, N.Y.

[21] Appl. No.: 756,191

[22] Filed: Jul. 18, 1985

[30] Foreign Application Priority Data

Jul. 26, 1984 [NL] Netherlands ......................... 8402352

[51] Int. Cl.$^4$ .............................................. H03D 3/00
[52] U.S. Cl. ....................................... 375/78; 375/88; 375/110; 328/20
[58] Field of Search ...................... 375/88, 78, 45, 110, 375/86, 113; 328/20; 455/314

[56] References Cited

U.S. PATENT DOCUMENTS 4,232,387 11/1980 Cottatellucci ...................... 375/110
4,250,456 2/1981 Shinmyo et al. ...................... 375/86
4,539,524 9/1985 Goode ................................. 375/88

Primary Examiner—Robert L. Griffin
Assistant Examiner—M. Huseman
Attorney, Agent, or Firm—Edward W. Goodman; Anne E. Barschall

[57] ABSTRACT

An arrangement for recovering a clock signal of frequency 1/T from an angle-modulated carrier signal having a modulation index m=0.5 comprises a frequency doubler, a circuit for generating a clock signal component from the frequency-doubled signal, a clock filter for selecting the generated clock signal component and a pulse shaper for producing a clock pulse signal.

The arrangement produces a reliable clock signal within a very short time after the start of the signal reception, because the frequency doubler comprises a hard limiter, a first bandpass filter connected thereto and having a Q≦10, a balanced modulator connected to the limiter and to the first bandpass filter and a second bandpass filter having a Q≦10 tuned to twice the carrier frequency $2f_c$; and because the generating circuit comprises a frequency converter for converting the frequency-doubled signal to a frequency band around a carrier frequency $f_o$ of the order of twice the clock frequency 2/T, a bandstop filter tuned to frequency $f_o$ and having a Q≦10 and a squaring circuit connected to the band stop filter. The arrangement is attractive for use in receivers for radio communication systems which require a very fast acquisition of the correct clock phase.

2 Claims, 6 Drawing Figures

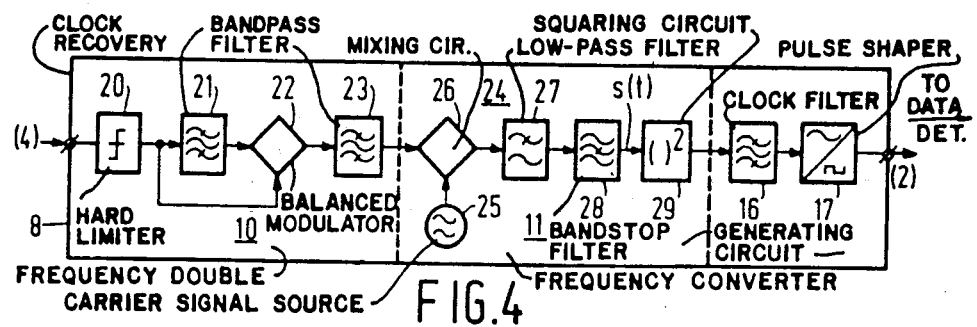
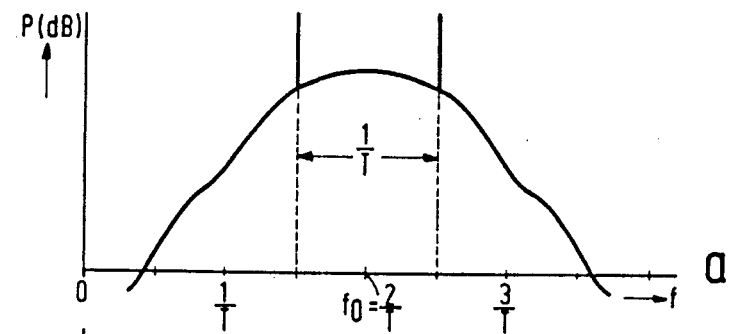
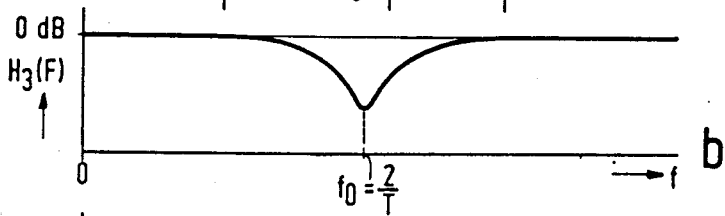
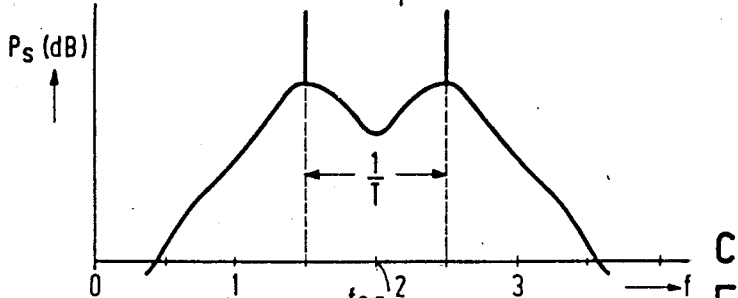
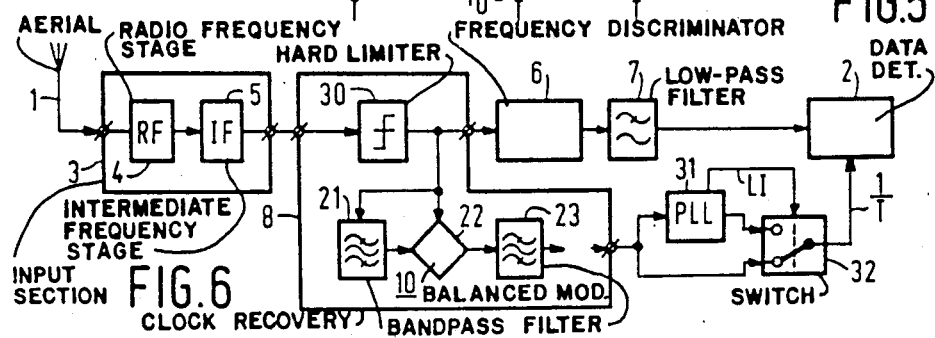
FIG.4
FIG.5
FIG.6

ARRANGEMENT FOR RECOVERING A CLOCK SIGNAL FROM AN ANGLE-MODULATED CARRIER SIGNAL HAVING A MODULATION INDEX M=0.5

(A) BACKGROUND OF THE INVENTION

The invention relates to an arrangement for recovering a clock signal in a receiver for an angle-modulated carrier signal having a carrier frequency $f_c$ and a modulation index m=0.5 generated in response to data signals of a given clock frequency 1/T, the arrangement comprising a frequency-doubler for doubling the frequency of said modulated signal; a generating circuit for generating a signal component of clock frequency 1/T from the frequency-doubled modulated signal; a clock filter for selecting the generated clock signal component; and a pulse shaper for producing a clock pulse signal in response to the selected signal component.

Such an arrangement is described in the article by De Buda on FFSK (Fast Frequency Shift Keying) in IEEE Transactions on Communications, Vol. COM-20, No. 3, June 1972, pages 429–435 (see FIG. 4). The FFSK signal having a modulation index m=0.5 has itself a power density spectrum with only continuous information-conveying components, but the frequency doubling operation provides an FFSK signal having a modulation index m=1, which comprises both continuous information-conveying components and also discrete components at the frequencies $2f_c - 1/(2T)$ and $2f_c + 1/(2T)$. The prior art arrangement utilizes this last fact for generating a signal component of clock frequency 1/T by selecting in the generating circuit the two discrete components with the aid of narrow bandpass filters, multiplying the selected discrete components by each other in a mixing circuit and thereafter separating the mixing product at the difference frequency 1/T from the mixing product at the sum frequency $4f_c$ with the aid of a low-pass filter. In this simple way, the clock and carrier signal references can be recovered from the received FFSK signal itself and these references can be used for an optimum detection of the data signals with the aid of orthogonal coherent demodulation and synchronous data symbol detection and regeneration. Also with a view to the required constant amplitude of these references the narrow bandpass filters in the prior art arrangement are realized in the form of a PLL (Phase-Locked Loop).

This prior art method of recovering clock and carrier signal references is particularly suitable for applications in which the data signals are transmitted continuously or at least during comparatively long time intervals. This method is, however, less suitable for application in radio communication systems in which the data signals are transmitted in time intervals of relatively short durations, such as in TDMA- or FH-systems (Time Division Multiple Access; Frequency Hopping) and the receiver must recover the references in a small initial fraction preamble of this already short time interval at the proper frequency and in the correct phase, as a reliable performance of coherent demodulation or synchronous symbol detection is not possible before the correct phase has been obtained. The reason why the known arrangement is less suitable for a fast acquisition of the reference phases resides in the fact that at the customary choice of the intermediate frequency stages of the receiver in the frequency range from several hundreds of kHz to approximately 10 MHz and the customary values for the clock frequency 1/T of the data signals of not more than some tens of kHz, the selection of the two discrete components from the FSK signal obtained by frequency doubling requires in this intermediate frequency range two very narrow bandpass filters, since their centre frequencies differ only by an amount equal to the clock frequency 1/T. Using a very narrow bandpass filter does not only require very accurate tuning but it is also accompanied by a slow acquisition of the correct reference phase and this last-mentioned problem is still further aggravated when this narrow bandpass filter is realised as a PLL, as in the prior art arrangement, since a PLL can dwell in the incorrect phase for an extended time when the initial phase error falls very close to the unstable null of the characteristic of the phase detector so that the phase detector output signal is very small. The problem of a fast acquisition of the carrier phase can be circumvented by utilizing a non-coherent demodulator, such as a frequency discriminator, but then the problem of a fast acquisition of the clock phase remains.

Although the above problems are described for FFSK signals, they hold in a much more general way and more specifically for that class of modulation methods which result in an angle-modulated carrier signal having a modulation index m=0.5 and a constant amplitude. This class of constant envelope modulation methods is particularly attractive for use in radio communication systems because of their economic use of the available bandwidth and the suitability for achieving a high power efficiency by means of circuit elements having a non-linear amplitude transfer function. Known representatives of this clas of modulation methods are TFM (Tamed Frequency Modulation), GMSK (Gaussian Minimum Shift Keying) and GTFM (Generalized TFM) which are described in IEEE Transactions on Communications, Vol. Com-26, No. 5, May 1978, pages 534–542, and Vol. COM-29, No. 7, July 1981, pages 1044–1050, and in Philips Journal of Research, Vol. 37, No. 4, 1982, pages 165–177, respectively.

(B) SUMMARY OF THE INVENTION

The invention has for its object to provide an arrangement of the type described in the preamble of paragraph (A), which within a comparatively short time after the beginning of signal reception produces a clock signal for effecting a sufficiently reliable symbol detection and regeneration and which yet does not impose special requirements on the design and practical implementation of the circuit functions used therein.

The arrangement according to the invention is characterized in that the frequency doubler comprises:
a hard limiter for said modulated signal, a first bandpass filter connected to the limiter and tuned to the carrier frequency $f_c$ and having a quality factor $Q \leq 10$, a balanced modulator connected to the limiter and to the first bandpass filter, and a second bandpass filter connected to the modulator and tuned to twice the carrier frequency $f_c$ and having a quality factor $Q \leq 10$; and in that the generating circuit comprises:
a frequency converter connected to the frequency doubler for converting the filtered, frequency-doubled, modulated signal to a frequency band around a lower carrier frequency $f_o$ of the order of twice the clock frequency 2/T, a bandstop filter connected to the frequency converter and tuned to the lower carrier frequency $f_o$ and having a quality factor $Q \leq 10$, and a squaring circuit connected to the bandstop filter.

(C) SHORT DESCRIPTION OF THE DRAWINGS

An embodiment of the invention and its advantages will now be described in greater detail by way of example with reference to the accompanying drawings. Therein:

FIG. 4 shows a block diagram of an embodiment of the arrangement according to the invention for recovering a clock signal from an angle-modulated carrier signal having modulation index $m = 0.5$ suitable for use in the receiver of FIG. 1;

FIG. 5 shows some frequency diagrams to illustrate the operation of the arrangement of FIG. 4; and FIG. 6 shows a block diagram to illustrate the manner in which the arrangement of FIG. 4 can be connected to the other circuits of a receiver for angle-modulated carrier signals.

(D) DESCRIPTION OF AN EMBODIMENT

D(1) General Description

Figure 1:
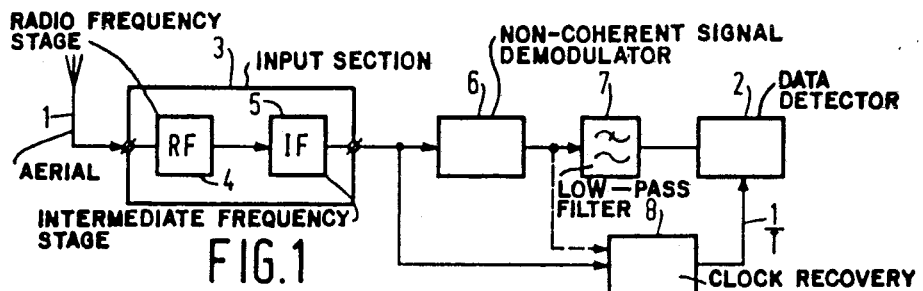
FIG. 1 shows a general block diagram of a receiver for angle-modulated carrier signals.

FIG. 1 shows a general block diagram of a receiver for angle-modulated carrier signals having a carrier frequency $F_c$ which are generated in response to data signals having a clock frequency $1/T$. The main signal path of this receiver between an aerial 1 and a data detector 2 comprises the cascade arrangement of an input section 3 (front end) comprising RF and IF stages 4, 5 (radio frequency, intermediate frequency) for frequency conversion of the received signals having a carrier frequency $F_c$ in the RF-band to a carrier frequency $f_c$ in the IF-band, and amplification of the IF-signal, a non-coherent signal demodulator 6 constituted by a frequency discriminator and a low-pass filter 7 for attenuating signal components outside the baseband of the data signals.

Figure 3:
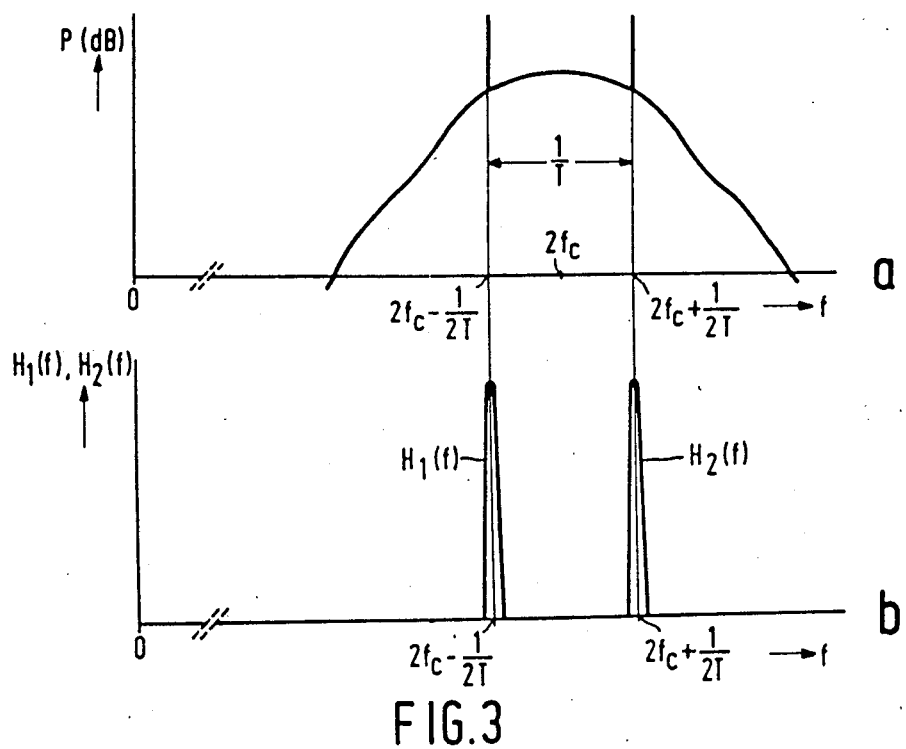
FIG. 3 shows some frequency diagrams to illustrate the operation of the arrangement of FIG. 2.

In addition, the receiver of FIG. 1 comprises an arrangement 8 for recovering a clock signal having a frequency $1/T$, which signal is used in data detector 2 for controlling the synchronous data symbol detection and recovery. Clock recovery arrangement 8 can be connected to the output of frequency discriminator 6 as is shown in FIG. 1 by means of a dotted line and disclosed in paragraph (A) of the above-mentioned publication on GTFM (see FIG. 8), but with a view to a fast acquisition of the clock signal, arrangement 8 is connected in FIG. 1 to the output of IF-stage 5 so as to take as much advantage as possible of the inevitable propagation delay of the signals in the main signal path for the clock recovery, which connection mode as such is known from the publication on FFSK mentioned in paragraph (A) (see FIG. 3).

Figure 2:
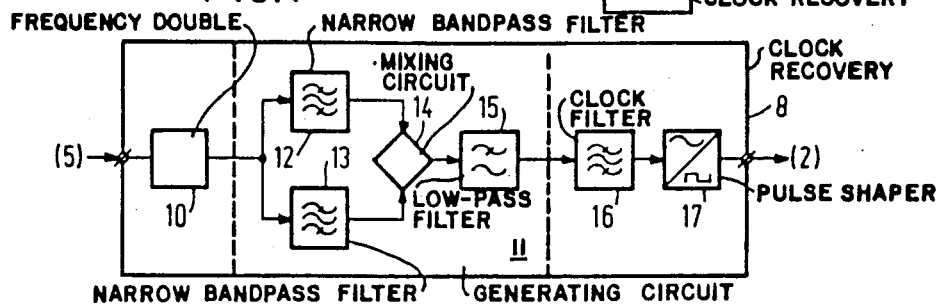
FIG. 2 shows a block diagram of a prior art arrangement for recovering a clock signal from an angle-modulated carrier signal having modulation index $m = 0.5$ suitable for use in the receiver of FIG. 1.

FIG. 2 shows the block diagram of an arrangement 8 for recovering the clock signal from an angle-modulated carrier signal having modulation index $m = 0.5$, which can be used in the receiver of FIG. 1 and is described in the last-mentioned publication (see FIG. 4).

Arrangement 8 of FIG. 2 comprises a frequency doubler 10 in which the modulated signal having a modulation index $m = 0.5$ and carrier frequency $f_c$ in the IF-band is subjected to a squaring process for obtaining a modulated signal having a modulation index $m = 1$. The power density spectrum P of the modulated signal with $m = 0.5$ generally comprises only continuous information-conveying components, but the spectrum P of the frequency-doubled modulated signal with $m = 1$ comprises in addition thereto also discrete components at the frequencies $2f_c - 1/(2T)$ and $2f_c + 1/(2T)$. An example of this last spectrum P is shown in diagram a of FIG. 3, more specifically for the case of an GTFM signal having parameters $B = 0.62$ and $r = 0.36$; the type of GTFM signal being characterized with the aid of a premodulation filter in the transmitter constituted by a transversal filter having 3 coefficients A, B, A, where $2A + B = 1$, and a low-pass filter satisfying the third Nyquist criterion and based on a low-pass filter having a Racos-characteristic (Racos = raised cosine) and a roll-off factor r satisfying the first Nyquist criterion (cf. Sec. 2 of said publication on GTFM).

The arrangement 8 of FIG. 2 utilizes the presence of the two discrete components in the output signal of frequency doubler 10 for generating a signal component having the clock frequency $1/T$. To that end, a generating circuit 11 which is connected to frequency doubler 10 selects the two discrete components with the aid of two narrow bandpass filters 12 and 13, whose central frequencies are equal to $2f_c - 1/(2T)$ and $2f_c + 1/(2T)$, respectively, and whose respective filter characteristics $H_1(f)$ and $H_2(f)$ are schematically shown in diagram b of FIG. 3. In generating circuit 11 the selected signal components at the outputs of filters 12 and 13 are multiplied by each other in a mixing circuit 14 and thereafter the mixing product at the difference frequency $1/T$ is separated from the mixing product at the sum frequency $4f_c$ using a simple low-pass filter 15. The clock signal component is selected from the mixing product at the difference frequency $1/T$ using a clock filter 16, which attenuates adjacent signal components for obtaining a clock signal having an adequately low value of phase jitter. The output signal of this clock filter 16 is applied to a pulse shaper 17 for producing a clock pulse signal which is suitable for controlling data detector 2 in FIG. 1.

As is already mentioned in paragraph (A), the customary choice of the IF-band of the receiver (in which carrier frequency $f_c$ is located) in combination with the normal range of clock frequency $1/T$ for data transmission has for its result that the two filters 12, 13 in FIG. 2 must have a very narrow passband, since their central frequencies are located near the comparatively high double carrier frequency $2f_c$ with a mutual spacing equal to the comparatively low clock frequency $1/T$. Such very narrow bandpass filters 12, 13 impose very strict requirements on establishing and maintaining an accurate tuning and moreover cause a significant delay in the signal propagation, so that the acquisition of the proper phase of the clock signal component at the output of low-pass filter 15 proceeds only very slowly. When these filters 12, 13 are in the form of a PLL, then the tuning problem becomes less important, but the acquisition problem worsens since a PLL exhibits, in addition to its normal inertia, an effect which may be termed as "hang up". This effect occurs for initial phase errors falling very close to the unstable null of the phase detector characteristic so that the error signal produced by the phase detector is very small. The speed at which a PLL returns to the stable null depends on this error signal:

If this error signal is very small, then the recovery speed is very slow. For initial phase errors very close to the unstable null the PLL then tends to dwell in the wrong phase an extended time, before eventually pulling into the correct phase (associated with the stable null). This "hang up" effect implies that a portion of the acquisition attempts will proceed abnormally slowly. This property is impermissible for applications in radio communication systems in which data signals are transmitted in time intervals of very short durations (bursts in TDMA, transmission hops in FH) and a fast acquisition is required in a small initial fraction (preamble) of this short time interval.

D(2) Description of the arrangement shown in FIG. 4

FIG. 4 shows a block diagram of an arrangement 8 in accordance with the invention which within a very short time after the beginning of the signal reception produces an appropriate clock signal for effecting a sufficiently reliable symbol detection and regeneration in data detector 2, which arrangement 8 in spite thereof does not impose special requirements on the design and the practical implementation of the circuit functions used therein. Components in FIG. 4 which correspond to those in FIG. 2 are given the same reference numerals.

Frequency doubler 10 of FIG. 4 comprises a hard limiter 20 for the angle-modulated signal of carrier frequency $f_c$ and modulation index $m=0.5$, to which a first bandpass filter 21 having a quality factor $Q \leq 10$ is connected for selecting the fundamental term of the hard-limited signal at the frequency $f_c$. The output signals of filter 21 and limiter 20 are respectively applied to the signal and carrier inputs of a balanced modulator 22, to which a second bandpass filter 23 also having a quality factor $Q \leq 10$ is connected for selecting the frequency-doubled modulated signal at the frequency $2f_c$ having a modulation index $m=1$.

Generating circuit 11 in FIG. 4 comprises a frequency converter 24 which is connected to the frequency doubler 10 to convert the selected modulated signal at the frequency $2f_c$ to a frequency band around a lower carrier frequency $f_o$ of the order of twice the clock frequency $2/T$. To that end, converter 24 of FIG. 4 comprises a source 25 for producing a carrier signal of a constant amplitude and a constant frequency $2f_c + f_o$ which in a mixing circuit 26 is multiplied by the output signal of frequency doubler 10 at the frequency $2f_c$, whereafter the mixing product at the difference frequency $f_o$ is separated from the mixing product at the sum frequency $4f_c + f_c$ using a simple low-pass filter 27. In the generating circuit 11 of FIG. 4 a bandstop filter 28 having a quality factor $Q \leq 10$ is connected to converter 24 for attenuating signal components in the central portion at the frequency $f_o$ of the frequency-converted modulated signal having modulation index $m=1$. For generating a signal component having a clock frequency $1/T$ the output signal of bandstop filter 28 is now subjected to a squaring process, for which purpose a squaring circuit 29 is connected to bandstop filter 28 in FIG. 4. This squaring circuit 29 may be in the form of a balanced modulator, whose signal and carrier inputs both receive the output signal from bandstop filter 28.

In a similar way as in FIG. 2, the generated clock signal component is selected in FIG. 4 with the aid of clock filter 16 which attenuates adjacent signal components for obtaining a clock signal having an adequately low value of phase jitter, whereafter the selected clock signal is applied to pulse shaper 17 for producing the clock pulse signal for controlling data detector 2 in FIG. 1.

The operation of arrangement 8 in FIG. 4 will now be described with reference to the diagrams in FIG. 5, more specifically again for the case of an GTFM-signal with parameters $B=0.62$ and $r=0.36$. The frequency-doubled modulated signal having a modulation index $m=1$ and a carrier frequency $2f_c$ in the IF-band whose spectrum P is shown in diagram a of FIG. 3 occurs again at the output of frequency doubler 10 in FIG. 4. The frequency conversion in converter 24 now results in a modulated signal having a modulation index $m=1$ and a spectrum P of the same shape as in diagram a of FIG. 3, but now having a much lower carrier frequency $f_o$. This last spectrum P is shown in diagram a of FIG. 5 for the case in which $f_o = 2/T$, the discrete components consequently occuring at the frequencies:

$$f_o - 1/(2T) = 2/T - 1/(2T) = 3/(2T)$$
$$f_o + 1/(2T) = 2/T + 1/(2T) = 5/(2T) \qquad (1)$$

By applying the output signal of converter 24 to bandstop filter 28 with a central frequency $f_o$, whose filter characteristic $H_3(f)$ expressed in dB is shown in diagram b of FIG. 5 for the case in which $f_o = 2/T$ and $Q=10$, an input signal $s(t)$ for squaring circuit 29 is obtained having a spectrum $P_s$, whose shape is shown in diagram c of FIG. 5.

If it is assumed that this signal $s(t)$ may be considered as being the sum of two double-sideband modulated signals having respective carrier frequencies $f_o - 1/(2T)$ and $f_o + 1/(2T)$, which assumption is supported by the shape of spectrum $P_s$ in diagram c of FIG. 5, this signal $s(t)$ can then be written as:

$$s(t) = A(t) \cdot \sin\,[\pi(2f_o - 1/T)t + \phi(t)] + + B(t) \cdot \sin\,[\pi(2f_o + 1/T)t + \theta(t)] \qquad (2)$$

where $A(t)$ and $B(t)$ represent the respective amplitude variations which depend on the time pattern of the data signals and $\phi(t)$ and $\theta(t)$ represent the respective phase modulations which also depend on this data time pattern. (as can be easily checked) Squaring the signal $s(t)$ of formula (2) results in a signal $[s(t)]^2$ which in addition to the terms at the frequencies $f=0$, $2f_o - 1/T$, $2f_o + 1/T$, also comprises (a) term $c(t)$ at the frequency $f = 1/T$ which is given by:

$$c(t) = A(t) \cdot B(t) \cdot \cos\,[2\pi t/T + \theta(t) - \phi(t)] \qquad (3)$$

At the chosen value $f_o = 2/T$ the next higher term is located at the frequency $f = 2f_o - 1/T = 3/T$, so that for selecting signal $c(t)$ of formula (3) a clock filter 16 having a quality factor Q of only a medium value ($Q \sim 30$) is sufficient.

In the normal case for data transmission, in which the possible values of the data symbols to be transmitted occur with equal probabilities (which is guaranteed by the use of a data scrambler which for that matter is even prescribed for the greater majority of practically used data transmission systems), the average values of A(t) and B(t) are substantially equal and the average value of the difference $\theta(t)-\phi(t)$ is substantially constant to a very good approximation. As a result thereof, the signal c(t) of formula (3) selected by clock filter 16 will always have an adequately high amplitude and an adequately low value of phase jitter for a reliable control of the data detector 2 in FIG. 1, as has indeed been confirmed by extensive experiments.

Moreover, this clock signal in arrangement 8 of FIG. 4 is already available within a very short period of time after the start of the signal reception. This advantage, which is particularly important for TDMA- or FH-systems which require a fast acquisition of a reliable clock signal, is a direct result of the fact that arrangement 8 of FIG. 4—contrary to the arrangement 8 of FIG. 2—need not utilize filters having a very narrow pass-band and consequently a very high quality factor Q thereby producing a large delay in the signal propagation, but can confine itself to filters having a quality factor Q of a low value (namely $Q \leq 10$ for filters 21, 23 and 28) or a medium value (namely $Q \sim 30$ for clock filter 16) and which consequently produce a much smaller delay in the signal propagation. An additional advantage of the use of filters having such a low or medium value of quality factor Q is that hardly any significant requirements need be imposed on establishing and maintaining an accurate tuning because the filter output signal is then only a little sensitive to tuning offset. In this connection it is advantageous to realize clock filter 16 having a quality factor $Q \sim 30$ in the form of a cascade arrangement of two filters, each having a quality factor $Q \sim 6$.

A further advantage is obtained by the use of limiter 20 as the input circuit of arrangement 8 in FIG. 4. For, especially in mobile radio communication systems, the strength of the received signal may vary over a large dynamic range, but the use of the hard limiter eliminates the necessity that the other circuits involved in the clock recovery also have to be arranged for operating over such a large dynamic range. The design and the practical implementation of the circuit for the several function in arrangement 8 of FIG. 4 is significantly simplified thereby. For the modulation methods considered here, such as GTFM and GMSK, the input signal of arrangement 8 may be qualified as a narrow-band FM signal and, as is well known, a hard limiter then does not affect the information contained in the signal. In addition, a hard limiter has hardly any influence on the signal-to-noise ratio SNR of the input signal, as the ratio k of $SNR_o$ at the output to $SNR_i$ at the input of the limiter varies only from a value $k=\pi/4$ for $SNR_o \rightarrow 0$ to a value $k=2$ for $SNR_i \rightarrow \infty$.

If now for the above-mentioned reasons and in the manner shown in FIG. 6 the main signal path of the receiver already contains a hard limiter 30 preceding frequency discriminator 6, then frequency doubler 10 of arrangement 8 need not make use of a separate limiter 20 as in FIG. 4, but the first bandpass filter 21 can be connected to the output of the limiter 30 already present.

FIG. 6 further shows how a robust long-term stability of the recovered clock signal can be obtained in a simple way by connecting a suitable PLL-circuit 31 to the output of arrangement 8 and by connecting the outputs of arrangement 8 and PLL-circuit 31 via a two-position switch 32 to the clock input of data detector 2. During the relatively long acquisition time of PLL-circuit 31 the clock signal available at the output of arrangement 8 is applied directly to data detector 2 and the clock signal at the output of PLL-circuit 31 is applied to data detector 2 after this period. As the majority of the PLL-circuits 31 now available also produce a LI-signal (lock indication) this LI-signal can be utilized for controlling switch 32.

To illustrate the advantages obtained by the measures according to the invention, some experimental results are stated which were found in a practical implementation of a GTFM-receiver in accordance with the circuit diagram of FIG. 6 for binary data signals having a clock frequency $1/T = 16$ kHz. The measured, total delay in the clock signal path between the output of limiter 30 and the output of arrangement 8 amounts to approximately 10T, the greater part of which is introduced by clock filter 16, and the measured delay in the main signal path between the output of limiter 30 and data detector 2 amounts to approximately 3T, so that a reliable signal detection can already start after approximately 7T. In principle, this particularly low value of 7T can still be further reduced by decreasing the quality factor Q of clock filter 16, but in practice such a reduction makes hardly any sense as the decrease of quality factor Q is accompanied by an increase of the phase jitter of the recovered clock signal, for which a peak value of less than T/10 is found at a quality factor $Q \sim 30$ of clock filter 16.

What is claimed is:

1. An arrangement for recovering a clock signal in a receiver for an angle-modulated carrier signal having a carrier frequency $f_c$ and a modulation index $m = 0.5$ generated in response to data signals of a given clock frequency 1/T, the arrangement comprising a frequency doubler for doubling the frequency of said modulated signal; a generating circuit for generating a signal component of clock frequency 1/T from the frequency-doubled modulated signal; a clock filter for selecting the generated clock signal component; and a pulse shaper for producing a clock pulse signal in response to the selected signal component, characterized in that the frequency doubler comprises: a hard limiter for said modulated signal, a first bandpass filter connected to the limiter and tuned to the carrier frequency $f_c$ and having a quality factor $Q \leq 10$, a balanced modulator connected to the limiter and to the first bandpass filter, and a second bandpass filter connected to the modulator and tuned to twice the carrier frequency $2f_c$ and having a quality factor $\phi \leq 10$; and in that the generating circuit comprises:

a frequency converter connected to the frequency doubler for converting the filtered, frequency-doubled modulated signal to a frequency band around a lower carrier frequency $f_o$ of the order of twice the clock frequency 2/T, a bandstop filter connected to the frequency converter and tuned to the lower carrier frequency $f_o$ and having a quality factor $Q \leq 10$ and a squaring circuit connected to the bandstop filter.

2. An arrangement as claimed in claim 1, characterized in that the hard limiter of the frequency doubler comprises a limiter provided in a main signal path of the receiver preceding a demodulator for said modulated signal.

* * * * *